US009855495B2

(12) United States Patent
Mikoshiba et al.

(10) Patent No.: US 9,855,495 B2
(45) Date of Patent: Jan. 2, 2018

(54) GAME MACHINE, CONTROL METHOD USED THEREIN, AND STORAGE MEDIUM

(71) Applicants: Eiri Mikoshiba, Minato-ku (JP); Hiroshi Asato, Minato-ku (JP); Akihiro Takatoku, Minato-ku (JP)

(72) Inventors: Eiri Mikoshiba, Minato-ku (JP); Hiroshi Asato, Minato-ku (JP); Akihiro Takatoku, Minato-ku (JP)

(73) Assignee: KONAMI DIGITAL ENTERTAINMENT CO., LTD., Minato-ku, Tokyo (JP)

(*) Notice: Subject to any disclaimer, the term of this patent is extended or adjusted under 35 U.S.C. 154(b) by 294 days.

(21) Appl. No.: 13/734,658

(22) Filed: Jan. 4, 2013

(65) Prior Publication Data

US 2013/0344954 A1 Dec. 26, 2013

(30) Foreign Application Priority Data

Jun. 25, 2012 (JP) ................................ 2012-142438

(51) Int. Cl.
*A63F 13/02* (2006.01)
*A63F 13/25* (2014.01)
(Continued)

(52) U.S. Cl.
CPC .............. *A63F 13/02* (2013.01); *A63F 13/25* (2014.09); *A63F 13/60* (2014.09); *A63F 13/95* (2014.09); *A63F 13/79* (2014.09)

(58) Field of Classification Search
CPC .................. A63F 2001/0475; A63F 2001/008
(Continued)

(56) References Cited

U.S. PATENT DOCUMENTS

2002/0028710 A1* 3/2002 Ishihara .................. A63F 13/02 463/44
2003/0171142 A1* 9/2003 Kaji .......................... A63F 1/02 463/11
2007/0275782 A1 11/2007 Kaji et al.
(Continued)

FOREIGN PATENT DOCUMENTS

JP 11-099285 A 4/1999
JP 200187558 A 4/2001
(Continued)

OTHER PUBLICATIONS

Japanese Office Action with English Translation—dated Oct. 22, 2013.

(Continued)

*Primary Examiner* — Dmitry Suhol
*Assistant Examiner* — Ankit Doshi
(74) *Attorney, Agent, or Firm* — Howard & Howard Attorneys, PLLC

(57) ABSTRACT

A game machine acquires predetermined information used to reproduce a image of character during a game from a character card, and uses the image of character for a progress of the game. The game machine includes a Bar code reader adapted and configured to acquire from the character card, information of player name that is associated with a image of character as information used to identify each player playing the game. And, the game machine reproduces a plurality of images of characters during the game based on the predetermined information of each character card, and classifies each image of character reproduced during the game based on the information of player name associated with each image of character into classifications which are dealt with differently from each other in the game.

10 Claims, 7 Drawing Sheets

KC
SI
BI
NB
GG
CI
KG
FI
Shoji's
Kiku
HP 102
AT 25
SP 42
Lv 11
EX
Call LV2

(51) Int. Cl.

| | |
|---|---|
| ***A63F 13/98*** | (2014.01) |
| ***A63F 13/60*** | (2014.01) |
| ***A63F 13/95*** | (2014.01) |
| *A63F 13/79* | (2014.01) |

(58) Field of Classification Search

USPC .......................................................... 463/11

See application file for complete search history.

(56) References Cited

U.S. PATENT DOCUMENTS

| | | | |
|---|---|---|---|
| 2008/0085749 | A1 | 4/2008 | Kaji et al. |
| 2008/0132305 | A1 | 6/2008 | Kaji et al. |

FOREIGN PATENT DOCUMENTS

| | | | |
|---|---|---|---|
| JP | 2002-301264 | A | 10/2002 |
| JP | 200473681 | A | 3/2004 |
| JP | 2009-034314 | A | 2/2009 |
| JP | 2009-136556 | A | 6/2009 |
| KR | 10-2009-0007799 | | 1/2009 |

OTHER PUBLICATIONS

Korean Office Action with English Translation—dated Apr. 7, 2014.

Japanese Office Action with English Translation, dated Dec. 24, 2014.

Notification of Reasons for Refusal (English and Japanese), Patent Application No. 2015-255041, Date of Drafting: Feb. 16, 2017.

Decision to Grant a Patent (JP Application No. 2015-255041); dated Oct. 24, 2017; 7 pages.

Appeal Decision (JP Patent Application No. 2014-043256); dated Sep. 5, 2017; 3 pages.

* cited by examiner

1
Control unit
15
17
Game control unit
Reproducing unit
25
Data generating unit
26
18
Display control unit
Audio output control unit
19
4
Monitor
5
Speakers
16
Printer
3
Control panel
10
Bar code reader
External storage device
21
22
Game program
23
Game data
29
Sound effect data
28
Image data

GAME MACHINE, CONTROL METHOD USED THEREIN, AND STORAGE MEDIUM

CROSS REFERENCE TO RELATED APPLICATION

This application claims priority to Japanese Patent Application No. 2012-142438, filed Jun. 25, 2012, the disclosure of which is hereby incorporated by reference in its entirety.

TECHNICAL FIELD

The present invention relates to a game machine or the like in which predetermined information used to reproduce a predetermined image during a game is acquired from a recording medium, and the predetermined image reproduced during the game based on the acquired predetermined information is used for the progress of the game.

BACKGROUND ART

There are game machines in which predetermined information used to reproduce a predetermined image during a game is acquired from a recording medium, and the predetermined image reproduced during the game based on the acquired predetermined information is used for the progress of the game. As an example of the game machines, there has been known a game machine in which a character card with a bar code configured so as to include predetermined information printed thereon is used as a recording medium (for example, see Patent Literature 1).

Patent Literature 1: Japanese Patent Application Laid-Open No. 2002-301264.

SUMMARY OF INVENTION

Technical Problem

In the game machine discussed in Patent Literature 1, content such as a predetermined image is printed on a character card in advance. In other words, a character card on which content such as a predetermined image is printed in advance and so the type is restricted is usually used in the game machine. In addition, there is a game machine that output such character card after a game is played. However, in both cases, since content is printed on the character card in advance, a variation of a used card is limited. In addition, generally, a character card on which content is printed in advance does not include information specifying a holder. Thus, the game using the character card is not usually configured so as to use information of the holder. For this reason, even when a plurality of characters is reproduced in the game by a plurality of character cards, each character is uniformly dealt with.

In this regard, the present invention is directed to provide a game machine or the like which is capable of reproducing a plurality of predetermined images respectively associated with a plurality of players during a game such that the predetermined image is dealt with differently according to a holder.

Solution to Problem

A game machine of the present invention is a game machine acquiring predetermined information used to reproduce a predetermined image (KG) during a game from a recording medium (KC), and using the predetermined image reproduced during the game based on the acquired predetermined information for a progress of the game, and wherein the game machine comprises: an information acquiring device (10) that acquires player information that is recorded in the recording medium as information used to identify each player playing the game and is associated with the predetermined image from the recording medium, an image reproducing device (15) adapted and configured to reproduce a plurality of predetermined images during the game based on the predetermined information of each recording medium; and an image classifying device (15) adapted and configured to classify each predetermined image reproduced during the game by the image reproducing device based on the player information associated with each predetermined image into classifications (MC) and (SC) which are dealt with differently from each other in the game based on an acquisition result of the information acquiring device.

According to the present invention, a plurality of predetermined images is reproduced during a game based on a plurality of storage media. In addition, the predetermined images are classified into classifications based on the player information. In other words, it is possible to identify a holder using the player information and classify each predetermined image according to a holder. In addition, the classifications into which the predetermined images are classified are dealt with differently from each other. Thus, a plurality of predetermined images respectively associated with a plurality of players can be reproduced during a game so as to be dealt with differently from each other according to a holder using the player information. As a result, the development of a game can be diversified, and amusement of a game can be improved.

In an embodiment of the game machine of the present invention, a game in which a play of a predetermined range is performed in exchange for consumption of a predetermined cost may be used as the game, and the image classifying device may classify the predetermined images into classifications such that in first player information in which the predetermined information is first acquired on the play of the predetermined range and player information acquired after the first player information, pieces of player information corresponding to the same player as the first player information are classified into the same classification, and among pieces of player information acquired after the first player information, pieces of player information corresponding to a player different from the first player information are classified into another classification different from the same classification. In this case, the predetermined images corresponding to the first player information are classified into the same classification, and the predetermined images corresponding to another player information are classified into another classification. In other words, it is possible to classify the predetermined images corresponding to the first player information into the same classification and the remaining images into another classification based on the first player information. As a result, the same classification to which the predetermined images corresponding to the first player information belong can be dealt with differently from another classification. Thus, for example, different treatments can be made such that the predetermined images belonging to the same classification are dealt as an image of a player that is playing a game, and the predetermined images belonging to another classification are dealt with differently during a game as an image of another player. In other words, it is possible to change a way of dealing with a predetermined image according to a holder.

In an embodiment of the game machine of the present invention, the game machine may further comprise: a data generating device (15) adapted and configured to generate output data including reflected information used to reproduce a reflected image in which a game result is reflected such that the reflected image is used as the predetermined image and the reflected information is used as the predetermined information; and a data output device (16) adapted and configured to output the output data to a recording medium such that the reflected information is recorded as the predetermined information. In this case, it is possible to generate a recording medium in which the reflected information, used to reproduce the reflected image in which the game result is reflected, is recorded as the predetermined information. In addition, the reflected information of the recording medium is used to reproduce the reflected image as the predetermined information in a next game. In other words, it is possible to reproduce the reflected image in which the game result is reflected in a next or subsequent game through the recording medium.

Any kind of differences of deals may be employed as the difference between the classifications. For example, in an embodiment in which the recording medium recording the reflected information as the predetermined information is generated, the data generating device restricts a generation target of the output data in units of classifications, and the classifications may be dealt with differently from each other depending on whether or not generation of the output data is restricted. In this case, for example, a predetermined image owned by a player who is playing a game can be generated as a recording medium in which the reflected image in which the game result is reflected can be reproduced, but generation of a recording medium on a predetermined image owned by another player can be restricted.

Any information may be used as the player information. For example, in an embodiment of the game machine of the present invention, information of a player name set by each player may be used as the player information.

Any medium may be used as the recording medium. For example, in an embodiment of the game machine of the present invention, a medium in which at least any one of an image corresponding to the predetermined image and information corresponding to the predetermined information is displayed may be used as the recording medium. Alternatively, a printing target medium in which at least any one of an image corresponding to the predetermined image and information corresponding to the predetermined information is printed may be used as the recording medium. In these cases, an image corresponding to a predetermined image or information corresponding to predetermined information can be visually recognized.

In addition, the predetermined information may be recorded in the recording medium in any way. For example, in an embodiment of the game machine of the present invention, the predetermined information may be recorded in the recording medium as a code (NB) generated so as to include the predetermined information according to a predetermined standard or as data used to express the code as an image. Furthermore, in this embodiment, a 2D bar code (NB) may be used as the code.

A control method of the present invention is a control method of controlling a computer incorporated in a game machine acquiring predetermined information used to reproduce a predetermined image during a game from a recording medium, and using the predetermined image reproduced during the game based on the acquired predetermined information for a progress of the game, and wherein the control method of controlling the computer comprises the steps: an information acquiring step that acquires from the recording medium, player information that is recorded in the recording medium as information used to identify each player playing the game and is associated with the predetermined image; an image reproducing step that reproduces a plurality of predetermined images during the game based on the predetermined information of each recording medium; and an image classifying step that classifies each predetermined image reproduced during the game by the image reproducing device based on the player information associated with each predetermined image into classifications which are dealt with differently from each other in the game based on an acquisition result of the information acquiring device.

A storage medium of the present invention is a non-transitory computer readable storage medium storing a computer program for a game machine acquiring predetermined information used to reproduce a predetermined image during a game from a recording medium, and using the predetermined image reproduced during the game based on the acquired predetermined information for a progress of the game, and wherein the computer program is configured so as to cause a computer which is incorporated in the game machine to serve as: an information acquiring device adapted and configured to acquire from the recording medium, player information that is recorded in the recording medium as information used to identify each player playing the game and is associated with the predetermined image; an image reproducing device adapted and configured to reproduce a plurality of predetermined images during the game based on the predetermined information of each recording medium; and an image classifying device adapted and configured to classify each predetermined image reproduced during the game by the image reproducing device based on the player information associated with each predetermined image into classifications which are dealt with differently from each other in the game based on an acquisition result of the information acquiring device. By executing the control method or the computer program of the present invention, it is possible to realize the game machine of the present invention.

Incidentally, in the above description, in order to help with understanding of the present invention, reference numerals in the accompanying drawings are denoted in parentheses, but this is not intended to limit the present invention to the examples illustrated in the drawings.

Advantageous Effects of Invention

As described above, according to the present invention, a plurality of predetermined images is reproduced during a game based on a plurality of recording media and classified into classifications based on player information. In other words, a holder can be identified using player information, and each predetermined image can be classified according to a holder. In addition, classifications into which predetermined images are classified are dealt with differently from each other. Thus, a plurality of predetermined images respectively associated with a plurality of players can be reproduced during a game so as to be dealt with differently from each other according to a holder using player information.

DESCRIPTION OF EMBODIMENTS

Figure 1:
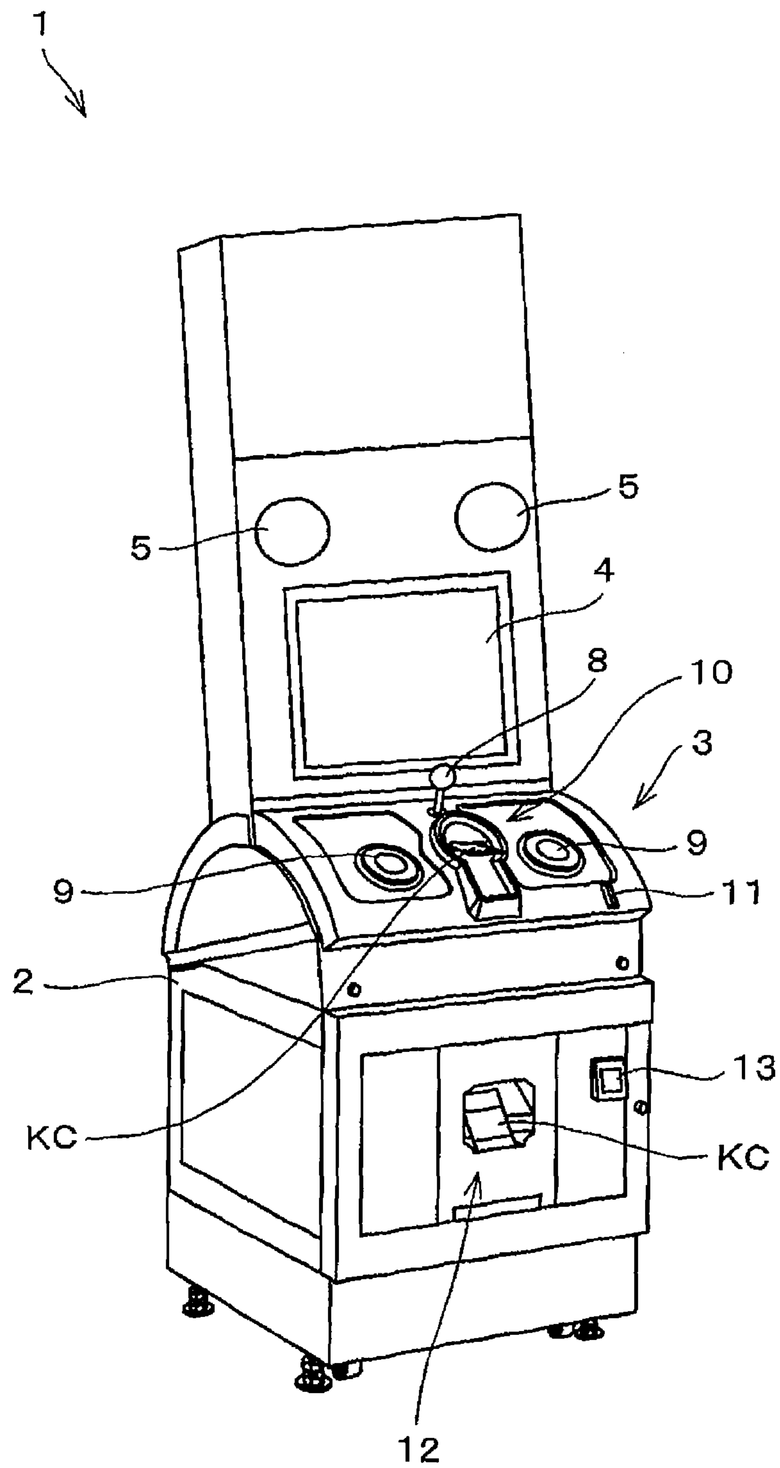
FIG. 1 is a diagram schematically illustrating an external appearance of a game machine according to an embodiment of the present invention.

Hereinafter, an embodiment of a game machine according to the present invention will be described. FIG. 1 is a diagram schematically illustrating an external appearance of a game machine according to an embodiment of the present invention. As illustrated in FIG. 1, a game machine 1 includes a housing 2. A control panel 3, a monitor 4, and speakers 5 are provided in an upper portion of the housing 2. The monitor 4 is arranged above the control panel 3. In addition, the speaker 5 is arranged further above the monitor 4. The game machine 1 is configured as an arcade game machine. In other words, the game machine 1 provides a predetermined game that can be played in a predetermined range in exchange for consumption of a predetermined cost. In addition, the game machine 1 provides a monster raising game as an example of a predetermined game. Incidentally, the game machine 1 further includes various kinds of input devices and output devices which are provided in a typical arcade game machine such as a volume operation switch, a power switch, and a power lamp as well as the control panel 3, which are not illustrated in FIG. 1.

The control panel 3 includes a direction selection operation unit 8 used to select a direction, a button 9 used to make a decision or the like, a bar code reader 10 serving as an information acquiring device, and a coin slot 11. The bar code reader 10 is configured so as to be able to read a 2D bar code and output a signal according to the reading result. A character card KC serving as a printing target medium is inserted into the bar code reader 10. A 2D bar code including information used to define a character is printed on the character card KC. For example, the bar code reader 10 reads the 2D bar code of the character card KC and acquires information of a character defined by the character card KC from the 2D bar code. In addition, a card dispensing opening 12 and a coin dispensing opening 13 are provided on the front surface of the housing 2. The character card KC printed inside the housing 2 is dispensed through the card dispensing opening 12. Incidentally, the control panel 3 includes various operating units such as a button used to decide an operation or the like, which are not illustrated in the drawings.

Figure 2:
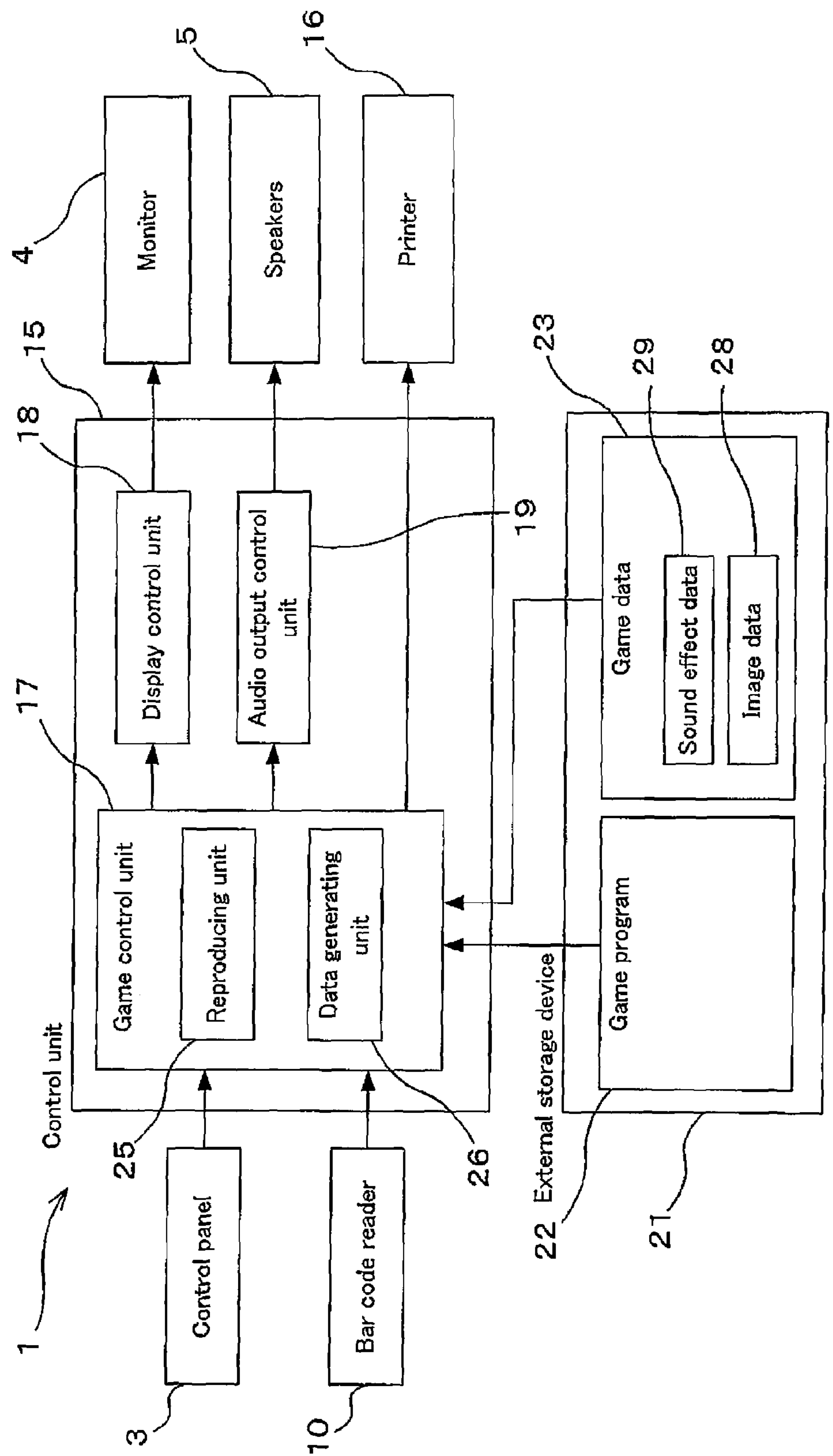
FIG. 2 is a functional block diagram of the game machine.

A configuration of the game machine 1 will be further described with reference to FIG. 2. FIG. 2 is a functional block diagram of the game machine 1. A control unit 15 serving as a computer and a printer 16 serving as a data output device are provided in the housing 2 of the game machine 1. The printer 16 is used to print the character card KC. The printer 16 is configured so as to have a color printing function.

The monitor 4, the control panel 3, the speakers 5, the bar code reader 10, and the printer 16 are all connected to the control unit 15. The control unit 15 includes a game control unit 17 serving as a main control entity, a display control unit 18 that operates according to an output from the game control unit 17, and an audio output control unit 19. The game control unit 17 is configured as a unit in which a microprocessor is combined with various kinds of peripheral devices such as an internal storage device (for example, a read only memory (ROM) and a random access memory (RAM)) necessary for an operation of the microprocessor.

The display control unit 18 causes a predetermined image to be displayed on the monitor 4 by rendering an image according to image data provided from the game control unit 17 in a frame buffer and outputting a video signal corresponding to the rendered image to the monitor 4. The audio output control unit 19 causes a predetermined sound (including music or the like) to be reproduced through the speakers 5 by generating an audio reproduction signal according to audio reproduction data provided from the game control unit 17 and outputting the audio reproduction signal to the speaker 5.

The game control unit 17 is connected to an external storage device 21. As the external storage device 21, there may be used a storage medium that can hold data even when electric power is not supplied such as a magnetic storage medium including a hard disk or the like, an optical storage medium including a digital versatile disk read only memory (DVDROM), a compact disk read only memory (CDROM) or the like, or a non-volatile semiconductor memory including an electrically erasable programmable read-only memory (EEPROM) or the like.

The external storage device 21 stores a game program 22 and game data 23. The game program 22 is a computer program necessary to execute a monster raising game according to a predetermined procedure through the game machine 1.

When the game machine 1 starts up, the game control unit 17 executes an operation program stored in an internal storage device thereof and executes various kinds of processes necessary to operate as the game machine 1. Subsequently, the game control unit 17 sets an environment necessary to execute the monster raising game according to the game program 22. As the game program 22 is executed by the game control unit 17, a reproducing unit 25 and a data generating unit 26 are generated in the game control unit 17. The reproducing unit 25 and the data generating unit 26 are logical devices actualized by a combination of computer hardware and a computer program.

The reproducing unit 25 executes a process for reproducing a character during a game based on information included in the 2D bar code read by the bar code reader 10. The data generating unit 26 executes a process for generating data necessary to print a new character card based on a play result of a game. Incidentally, the game program 22 includes various kinds of modules, and, in addition to the reproducing unit 25 and the data generating unit 26, various kinds of logical devices necessary to execute a game are generated in the game control unit 17 based on the modules but not illustrated in the drawings.

The game data 23 includes a variety of data to be referred to when the monster raising game is executed according to the game program 22. For example, the game data 23 includes image data 28 and sound effect data 29. The sound effect data 29 is data in which each of two or more types of sound effects to be output from the speakers 5 according to the player's operation or a game status are recorded in association with a unique code.

The image data 28 is data used to cause a background image of a game screen, various kinds of objects, icons, characters to appear in a game, or the like to be displayed on the monitor 4. The data used to display characters or the like, which is included in the image data 28 is associated with a unique code for each icon, for each character, or the like. The image data 28 further include format data used to express a format of the character card KC. The character card KC includes a fixed portion that is fixedly arranged as a format and a variable portion that varies according to a game result. The format data is data necessary to express the fixed portion among these portions.

Next, the monster raising game executed by the game machine 1 will be described. The player raises a monster within a game. Specifically, the player raises a monster by causing a monster of a raising target to fight with another monster or to deal with events during a game. The monster grows such that the strength thereof increases or a character thereof changes by raising. In addition, a new monster having a new character and the like is generated by synthesizing a plurality of monsters.

The monster of the raising target can be selected within a game. In addition, as the game machine 1 reads information of the character card KC through the bar code reader 10, a monster (character) printed on the character card KC and a card image representing the monster's character are displayed during a game. The card image is one in which the character card KC is reproduced as an image. In addition, the monster corresponding to the card image, that is, the monster defined by the character card KC is reproduced during a game. The monster of the character card KC reproduced during a game can be selected as a raising target. The card image or the image of the monster reproduced during a game functions as a predetermined image according to the present invention.

The player can print a monster raised through a game as a new character card KC. In other words, a monster raised through a battle with another monster or the like or a monster newly generated by synthesis can be generated as a new character card KC. The character card KC can be used in a next game. Thus, the character card can be used as a record of a raising result, and one character (monster) can be continuously raised.

As described above, it is possible to continuously raise a monster or generate a new monster using the character card KC. In addition, a game result is reflected in the character card KC, and it is difficult for another character card to have the same content. Thus, an original character card KC that is not the same as another character card can be generated. In addition, information of a player name used to identify each player is displayed on each character card KC. In other words, each character card KC is configured so as to be able to identify a holder based on information of the player name. The details of the character card KC will be described later.

Furthermore, in the monster raising game, a plurality of character cards KC can be reproduced during a game. Character cards KC of different holders may be used as the plurality of character cards KC. In other words, in the monster raising game, a character of another player can be used together with his/her own character. At this time, each character corresponding to each character card KC is classified into any one of a player card and an attending card based on a holder in the monster raising game. Each character classified into the player card can be selected as the raising target. In other words, as described above, the growth can be made through a battle or the like in a game, and the result can be made as the character card KC. As a result, the character (the character in which the raising result is reflected) can be used as the raising target at a next time and beyond. In other words, continuous raising can be made through the character card KC.

Meanwhile, each character classified into the attending card can attend a battle with another monster or the like, or an event during a game together with the character of the player card. However, each character classified into the attending card is not allowed to be made as the character card KC after the play. In other words, even when each character of the attending card possesses an item or grows as a game result, each character of the attending card is not succeeded in a next game. Each character of the attending card is merely used to assist the character of the player card temporarily (within a one-time play range). In other words, the character card KC of another player is used with restrictions. As described above, each character classified into the attending card is dealt with in a game differently from each character classified into the player card in that it is restricted to be reflected on a card. In addition, another option of a game may be restricted on each character classified into the attending card, for example, each character classified into the attending card may not be raised by the player. In other words, the difference in the dealing method between classifications of the player card and the attending card is not limited to reflection thereof in the card. The classifications of the player card and the attending card will be described later in further detail.

Figure 3:
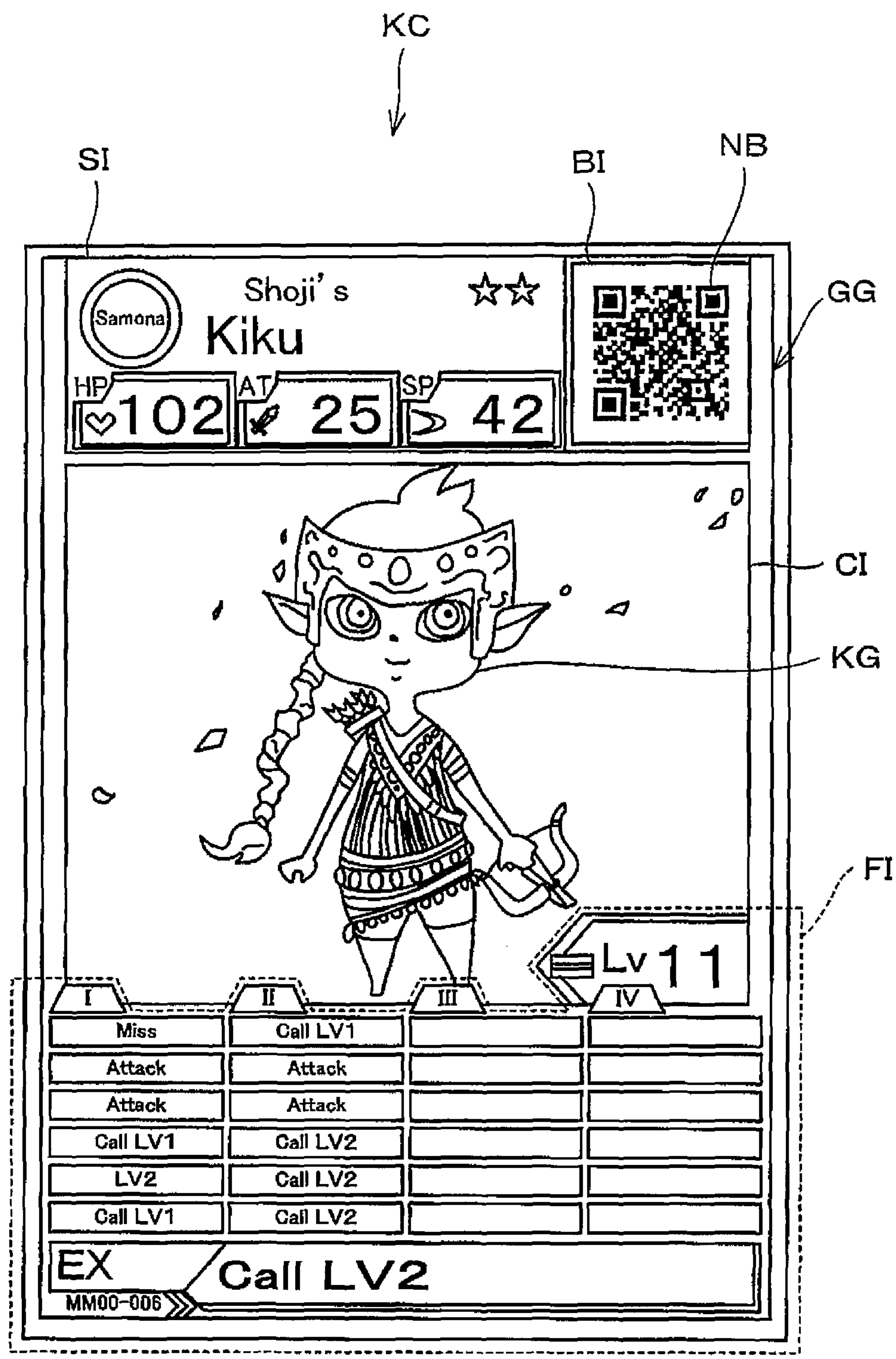
FIG. 3 is a diagram illustrating an example of a character card generated by the game machine.

Next, the character card KC generated by the game machine 1 will be described. FIG. 3 is a diagram illustrating an example of the character card KC generated by the game machine 1. As illustrated in FIG. 3, a synthesis image GG is printed on the character card KC. The synthesis image GG is formed such that a format formed by format data is synthesized with information of a game result arranged on the variable portion of the format. More specifically, the synthesis image GG includes a basic information region SI, a bar code information region BI, a character image region CI, and a feature information region FI. Incidentally, an image corresponding to the synthesis image GG is reproduced as a card image during a game.

The basic information region SI includes information of the player name serving as player information, information of a character name defined by each card, and status information representing a hit point (HP), an attack point (AT), a special point (SP), or the like of the character. An image KG of a character defined by each card is displayed on the character image region CI. When the character defined by each card is used during the game, the feature information region FI includes information of an option (technique) executable during a game, information of a deadly technique, and information of a card number representing an ID of each card.

A 2D bar code NB serving as predetermined information is displayed on the bar code information region BI as an example. The 2D bar code NB is used to reproduce a character defined by each card during a game. Specifically, the 2D bar code NB is used to be read by the bar code reader 10 of the game machine 1. For this reason, information represented by the 2D bar code NB includes each piece of information used to define a character included in the character card KC. Specifically, the 2D bar code includes information of the respective regions such as the basic information region SI, the character image region CI, and the feature information region FI. Incidentally, information such as a unique number representing the image KG of the character may be used as information of the image KG of the character in the character image region CI. For example, the game machine 1 displays the image KG of the character using a table in which a unique number is associated with the image KG of each character expressed by the image data 28.

The information of the respective regions of the basic information region SI, the character image region CI, and the feature information region FI change according to a play result of a game, that is, a raising result. For example, depending on a play result of a game, a hit point of a character increases, or an option executable during a game increases or changes. In other words, the information of the respective regions of the basic information region SI, the character image region CI, the feature information region FI is associated with the game result so as to change based on play content of a game.

As described above, the respective pieces of information of the respective regions of the basic information region SI, the character image region CI, and the feature information region FI change according to the game result. Similarly, the 2D bar code NB of the bar code information region BI also changes according to these respective pieces of information. In other words, the respective pieces of information included in the basic information region SI, the character image region CI, the feature information region FI, the bar code information region BI correspond to the variable portion of the character card KC. Meanwhile, the range or the number of the regions does not change. In other words, the fixed portion (format) of the character card KC is formed by a boundary line used to define the regions.

Figure 4:
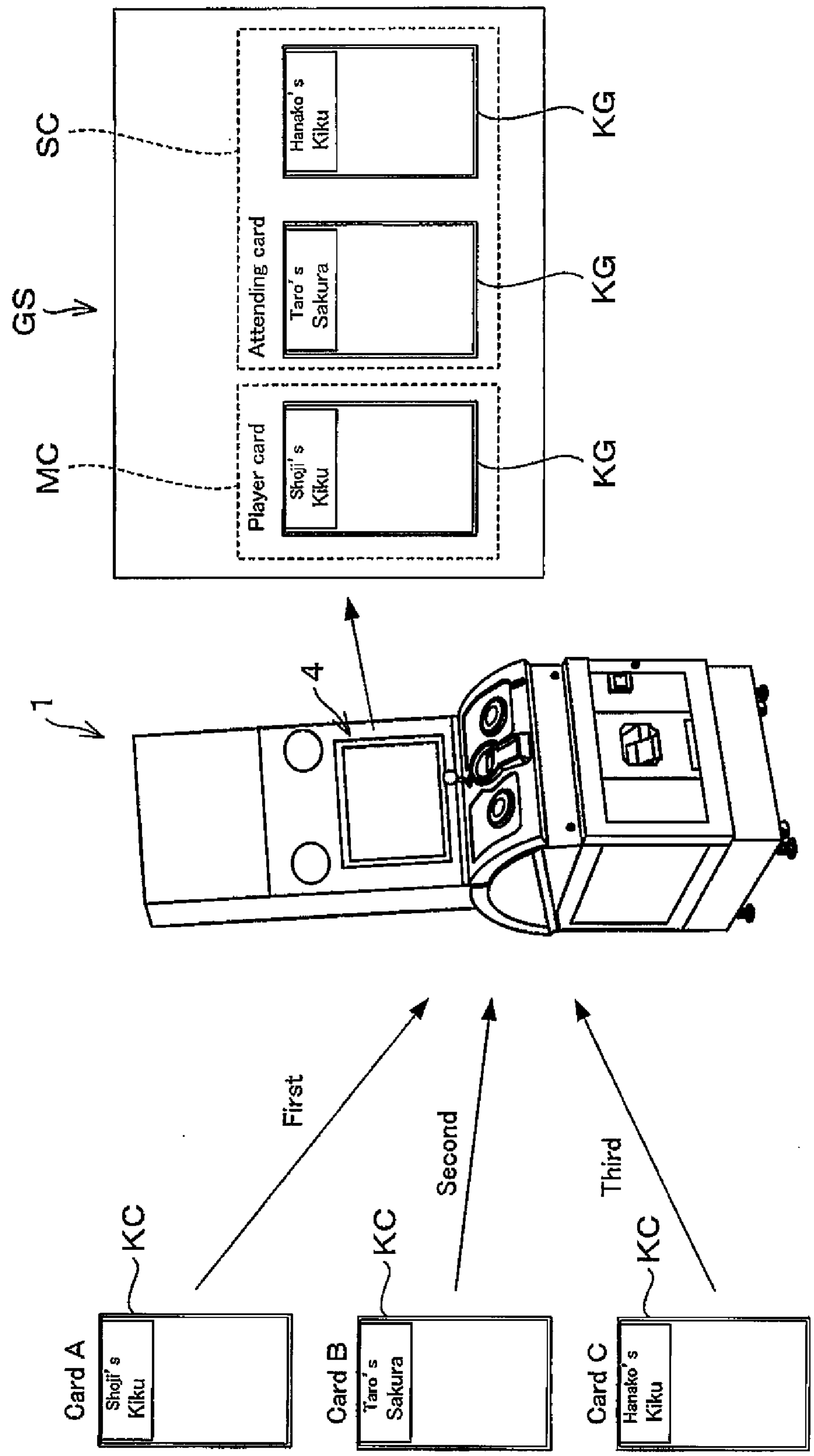
FIG. 4 is an explanatory diagram for describing an example of a classification method of a player card and an attending card.

Next, a classification of the player card and the attending card will be described in detail. FIG. 4 is an explanatory diagram for describing an example of a classification method of the player card and the attending card. FIG. 4 illustrates an example in which three character cards KC are read in the order of a card A, a card B, and a card C for single play. FIG. 4 also illustrates an example in which a method in which a classification is made based on a read order is employed as a classification method. In this case, as illustrated in FIG. 4, the card image KG corresponding to each character card KC is displayed on a game screen GS of the monitor 4 based on information of each character card KC read through the bar code reader 10. The card image KG is an image corresponding to the synthesis image GG printed on the character card KC. In addition, the card images KG are classified into a classification MC of the player card and a classification SC of the attending card. More specifically, in the game screen GS of the example of FIG. 4, the card image KG of the card A which is first read is classified into the classification MC of the player card, and the card images KG of the cards B and C which are subsequently read are classified into the classification SC of the attending card.

In the classification method of this example, the character card KC which is first read is classified into the classification MC of the player card. Then, a classification of each character card KC which is subsequently read is determined based on the player name of the first character card KC. Specifically, when a player name of a second or later character card KC is different from the player name of the first character card KC, the second or later card KC is classified into the classification SC of the attending card. On the other hand, when a second or later character card KC having the same player name as the first character card KC is read, the card KC is classified into the classification MC of the player card. As described above, when a plurality of character cards KC of different holders are read, the card image KG (or character) of each character card KC is classified into each classification MC or SC based on the player name of the character card KC which is first read.

In the example of FIG. 4, the player name of the card A which is first read is "Shoji." Meanwhile, the player names of the second card B and the third card C are "Taro" and "Hanako," respectively. In other words, the player name of the first character card KC is different from the names of the subsequent character cards KC. For this reason, the character of the card A which is first read is classified into the classification MC of the player card, and the characters of the cards B and C which are subsequently read are classified into the classification SC of the attending card. Incidentally, the classification method is not limited to this example. For example, a classification into player names may be made based on the player name. Then, a classification having the largest number of characters (or the card images KG) may be used as a classification of a holder, and may be more favorably dealt with in an option or the like than other classifications. Alternatively, the player name to belong to the player card may be selected by the player. In this case, a plurality of names may be designated as the player name to belong to the player card.

Next, a reproducing process, a card classifying process, and a data generating process will be described. The reproducing process is executed to reproduce a character (or the card image KG) defined by the character card KC during a game. The card classifying process is executed to classify corresponding characters when the character cards KC of different holders are read. The data generating process is executed to generate the character card KC corresponding to the character raised according to the game result (or to generate data used to express the synthesis image GG). Incidentally, the game control unit 17 executes various kinds of known processes necessary to execute the above-described monster raising game in addition to the above-mentioned processes, but a detail description thereof will not be made.

Figure 5:
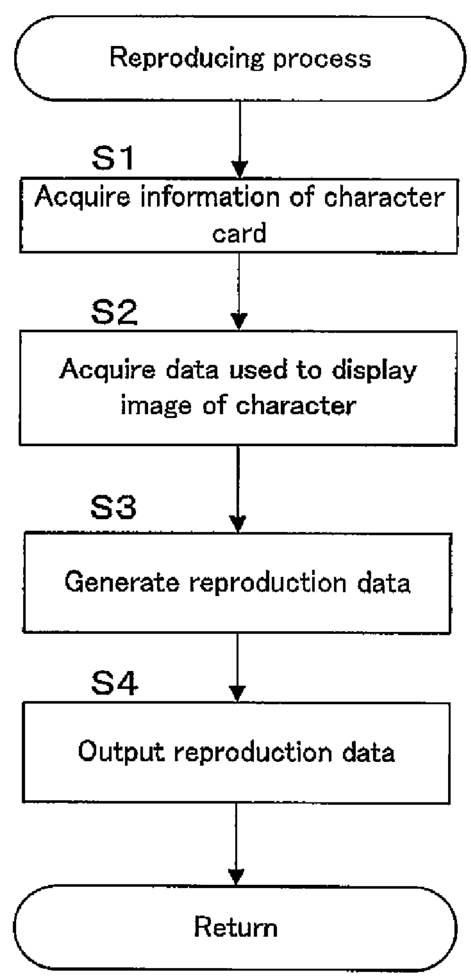
FIG. 5 is a diagram illustrating an example of a flowchart of a reproducing process routine.

FIG. 5 is a diagram illustrating an example of a flowchart of the reproducing process routine. For example, the routine of FIG. 5 is executed each time the bar code reader 10 reads the character card KC. For example, the routine of FIG. 5 is executed by the game control unit 17 as a process necessary to actualize the monster raising game. In addition, for example, the game control unit 17 executes the routine of FIG. 5 through the reproducing unit 25.

FIG. 5 is a diagram illustrating an example of a flowchart of the reproducing process routine. The routine of FIG. 5 is executed to reproduce a character defined by the character card KC during a game. For example, the reproducing unit 25 is executed with a predetermined period during a predetermined time period from a read start instruction of information of the 2D bar code to a game start instruction. Alternatively, the routine of FIG. 5 is executed based on an operation to cause the card to be inserted into the bar code reader 10, an operation to instruct reproduction, or the like.

When the reproducing process routine of FIG. 5 starts, in step S1, the reproducing unit 25 first acquires information used to define a character included in the character card KC. Specifically, information used to define the character included in the 2D bar code NB of the character card KC, that is, the respective pieces of information of the respective regions of the basic information region SI, the character image region CI, and the feature information region FI are acquired based on a signal output from the bar code reader 10.

Next, in step S2, the reproducing unit 25 acquires data used to display an image of a character corresponding to the character defined by the character card KC from the image data 28. Specifically, an image of a character corresponding to the character defined by the character card KC is specified from among images of characters displayable by the image data 28 based on the information included in the 2D bar code NB acquired in step S1. For example, the specifying is actualized by a unique number and a table in which the unique number is associated with an image of a character. Then, data used to display the specified image of the character is acquired from the image data 28. Incidentally, when the card image KG is displayed, the same process as the data generating process to be described below may be executed. At this time, in this process, each piece of information included in the 2D bar code NB may be used as information corresponding to the game result.

Next, in step S3, the reproducing unit 25 generates reproduction data used to reproduce the character defined by the character card KC during a game. The reproduction data includes data used to display the image of the character acquired in step S2. In addition, the reproduction data also include each piece of information acquired in step S21.

Next, in step S4, the reproducing unit 25 outputs the reproduction data generated in step S3 to a predetermined storage region, and then the current routine ends. A region in which a variety of data used in a game is at least temporarily stored, such as an internal storage device of the game control unit 17 or the external storage device 21, may be used as the predetermined storage region. The reproduction data is stored in the predetermined storage region and appropriately used according to the situation such as the development of a game. As a result, a character having a characteristic defined by the character card KC is reproduced during a game through the same image (a card image or an image of a character) as a display of the character card KC.

Figure 6:
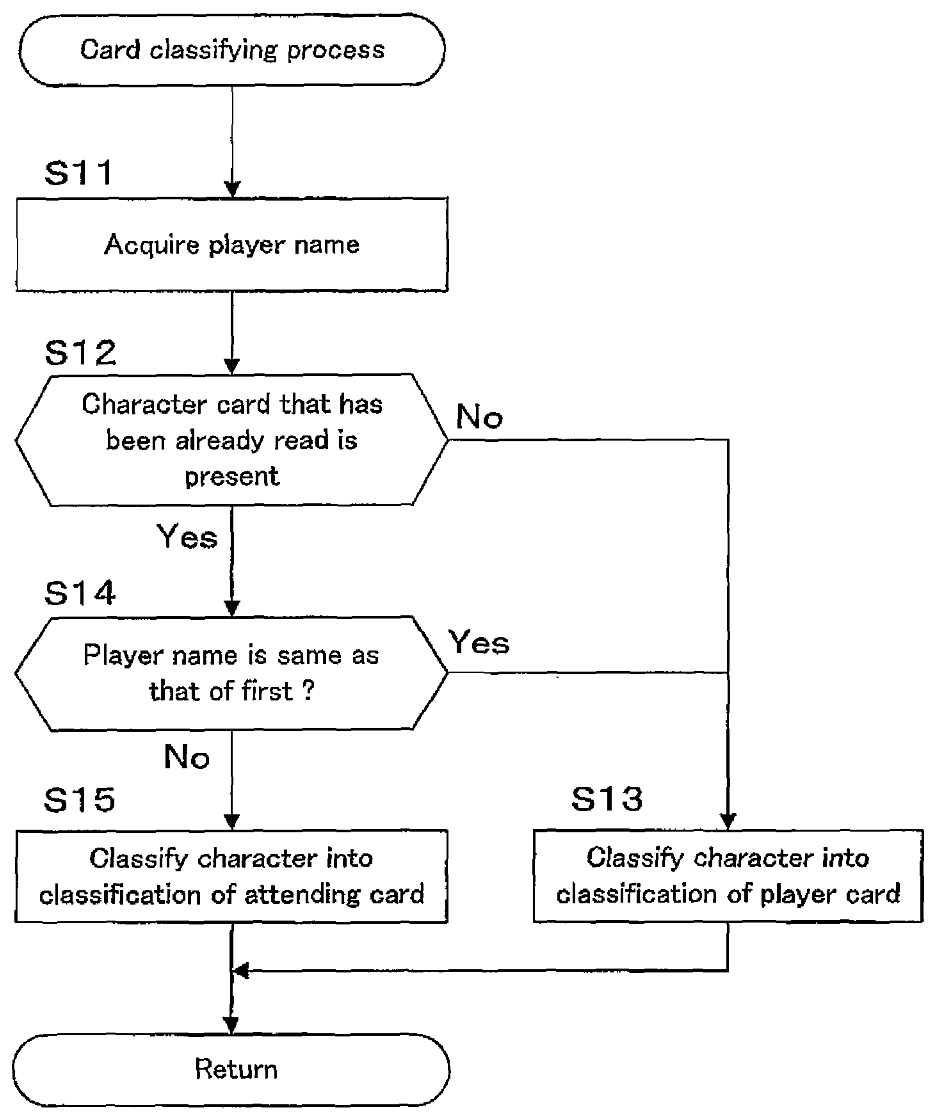
FIG. 6 is a diagram illustrating an example of a flowchart of a card classifying process routine.

Meanwhile, FIG. 6 is a diagram illustrating an example of a flowchart of the card classifying process routine. For example, the routine of FIG. 6 is executed by the game control unit 17 as a process necessary to actualize the monster raising game. In addition, for example, the game control unit 17 executes the routine of FIG. 6 through the reproducing unit 25. For example, the routine of FIG. 6 is executed each time the routine of FIG. 5 ends.

When the routine of FIG. 6 is started, in step S11, the reproducing unit 25 first acquires information of the player name of the character card KC read by the bar code reader 10 with reference to an output signal from the bar code reader 10. Next, in step S12, the reproducing unit 25 determines whether or not a character card KC that has been already read in a game is present. When the determination result is negative, that is, when it is determined that no character card KC that has been already read is present and a current character card KC is the first card KC, the reproducing unit 25 causes the process to proceed to step S13. In step S13, the reproducing unit 25 classifies the character of the current character card KC into the classification MC of the player card, and then the current routine ends.

In contrast, when the determination result of step S12 is positive, that is, when it is determined that the character card KC that has been already read is present, the reproducing unit 25 causes the process to proceed to step S14. In step S14, the reproducing unit 25 determines whether or not the player name of the firstly read character card KC among the already read character cards KC is the same as the player name of the currently read character card KC. For example, this determination is executed as follows. First, the reproducing unit 25 specifies the player name of the firstly read character card KC among the already read character cards KC. The character of the firstly read character card KC has already been classified as the player card. Thus, for example, the specifying is actualized by acquiring the player name of the character card KC classified into the classification MC of the player card. Then, the reproducing unit 25 compares the specified first player name with the current player name acquired in step S11, and determines whether or not the specified first player name is the same as the current player name. In the above-described way, the determination of step S14 is actualized as an example.

When the determination result of step S14 is positive, that is, when it is determined that the player name of the firstly read character card KC is the same as the player name of the current character card KC, the reproducing unit 25 causes the process to proceed to step S13. Then, in step S13, the reproducing unit 25 classifies the character of the current character card KC into the classification MC of the player card as described above, and then the current routine ends.

In contrast, when the determination result of step S14 is negative, that is, when it is determined that the player name of the firstly read character card KC is not the same as the player name of the current character card KC, the reproducing unit 25 causes the process to proceed to step S15. In step S15, the reproducing unit 25 classifies the character of the current character card KC into the classification SC of the attending card, and then the current routine ends. As a result, the character of the character card KC having the same player name as the firstly read character card KC is classified into the classification MC of the player card. Meanwhile, the character of the character card KC having the different player name from the firstly read character card KC is classified into the classification SC of the attending card. In other words, the character of each character card KC which is subsequently read is classified based on the player name of the firstly read character card KC.

Figure 7:
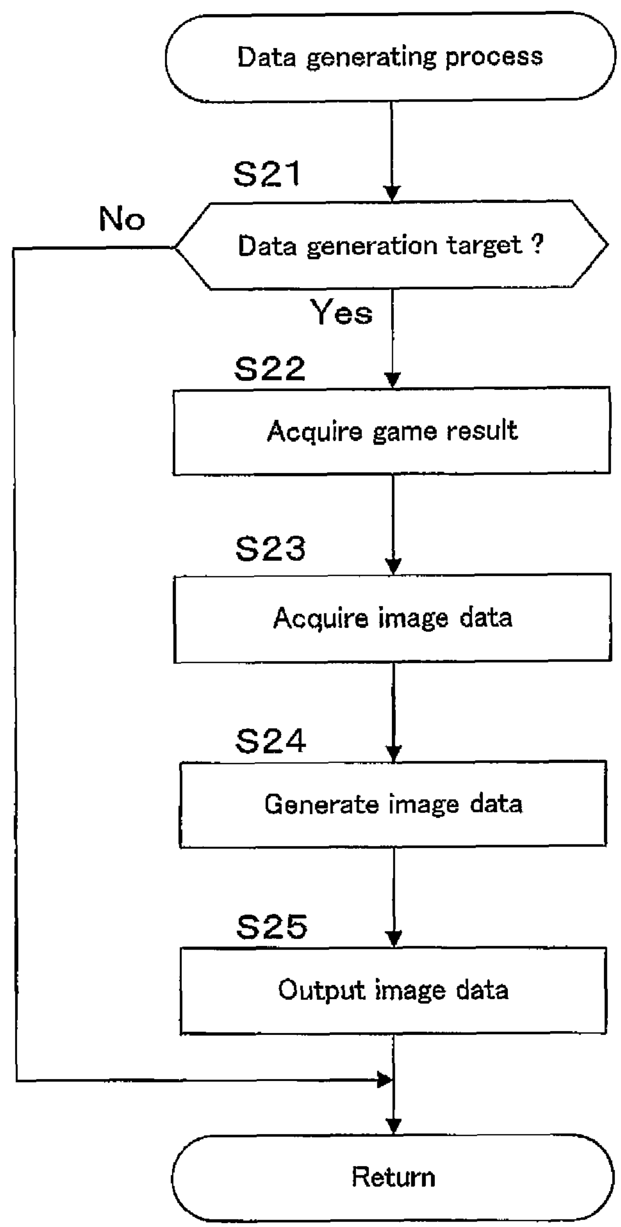
FIG. 7 is a diagram illustrating an example of a flowchart of a data generating process routine.

In addition, FIG. 7 is a diagram illustrating an example of a flowchart of the data generating process routine. For example, the routine of FIG. 7 is executed by the game control unit 17 as a process necessary to actualize the monster raising game. In addition, for example, the game control unit 17 executes the routine of FIG. 7 through the data generating unit 26. For example, the routine of FIG. 7 is executed based on a predetermined instruction given by the player such as a character card printing instruction. Incidentally, the predetermined instruction may include an operation of selecting a character which should be produced as a character card KC from among characters present in a game. In addition, for example, the routine of FIG. 7 may be executed each time a game ends.

When the routine of FIG. 7 is started, in step S21, the data generating unit 26 first determines whether or not a current target character (for example, a character selected as a character which should be produced as a character card KC) is a data generation target. This determination is executed based on the classification to which the current target character belongs. Specifically, the character belonging to the classification MC of the player card corresponds to a data generation target, and the character belonging to the classification SC of the attending card does not correspond to a data generation target. In other words, a data generation target is determined by specifying whether or not the current target character belongs to the classification MC of the player card. When the determination result is negative, that is, when it is determined that the current target character is not the data generation target (the current target character does not belong to the classification MC of the player card), the data generating unit 26 the current routine ends without performing the subsequent process. In addition, at this time, a notice representing that the character card KC cannot be generated may be given.

Meanwhile, when the determination result of step S21 is positive, that is, when it is determined that the current target character is the data generation target (the current target character belongs to the classification MC of the player card), the data generating unit 26 causes the process to proceed to step S22. In step S22, the data generating unit 26 acquires the game result corresponding to the current character. For example, the game result includes information of a character that has grown or changed by raising or the like, that is, the respective pieces of information that have changed through a game, such as the basic information region SI, the character image region CI, and the feature information region FI.

Next, in step S23, the data generating unit 26 acquires the image data 28 necessary to generate the character card KC corresponding to the character according to the game result acquired in step S22. The image data 28 also includes format data. Next, in step S24, the data generating unit 26 generates image data as output data necessary to print the character card KC. The image data includes bar code data used to express the 2D bar code NB configured so as to include information necessary to reproduce the current character. In addition, the image data further includes the game result acquired in step S22 and the image data 28 acquired in step S23. More specifically, as the image data to express the synthesis image GG, there is generated data to express the synthesis image GG in which a format expressed by format data is synthesized with respective pieces of information corresponding to the game result to be displayed on the variable portion such that concrete information according to the game result is displayed on the variable portion (the respective information of the basic information region SI, the feature information region FI, the character image region CI, and the bar code information region BI). The synthesis image GG also includes a display of the 2D bar code NB. Then, the 2D bar code NB in which the game result is reflected functions as reflected information according to the present invention.

Next, in step S25, the data generating unit 26 outputs the image data generated in step S24 to the printer 16 such that the synthesis image GG expressed by the image data is generated as the character card KC. Then, the printer 16 executes printing based on the image data such that the synthesis image GG is printed on the character card KC. The data generating unit 26 ends the current routine when the process of step S25 ends. As a result, the character card KC of the character belonging to the classification MC of the player card which has grown according to the game result is printed through the printer 16, and dispensed from the card dispensing opening 12. Meanwhile, generation of the image data on each character belonging to the classification SC of the attending card is restricted. In other words, production of a card is managed in classification units, and each character belonging to the classification SC of the attending card is not produced as the character card KC. As described above, the classifications MC and SC of the player card and the attending card are different from each other in treatment related to generation of the character card KC.

As described above, according to this embodiment, the character card KC in which the game result is reflected is generated through the game machine 1. In other words, content printed on the character card KC changes according to the game result. As a result, a plentiful variety of cards can be provided. In addition, it is possible to reproduce a plurality of characters (monsters) during a game through a plurality of character cards KC. Thus, for example, it is possible to actualize an event using a plurality of characters or the like, such as a team competition or team raising. As a result, the development of a game can be diversified, and thus amusement of a game can be improved.

In addition, the generated character card KC includes information of the player name. As a result, it is possible to identify the holder of the character card KC. Furthermore, information of the player name included in the character card KC is used for classification of a character (monster) reproduced during a game through the 2D bar code NB. In other words, each character can be classified according to a holder based on the information of the player name. Then, each classification is differently dealt with in an aspect such as a restriction to raising or generation of the character card KC. In other words, each character associated with each of a plurality of players can be reproduced during a game so as to be differently dealt with according to a holder. For this reason, although a monster owned by another player can be reproduced during a game, the monster is not dealt with in the same manner as his/her own monster. As a result, it is possible to encourage acquisition of his/her own character card KC, that is, the play of the game machine 1 while diversifying the development of a game.

In the above embodiment, the control unit 15 functions as the image reproducing device of the present invention by executing the routine of FIG. 5 through the reproducing unit 25. In addition, the control unit 15 functions as the image classifying device of the present invention by executing the routine of FIG. 6 through the reproducing unit 25. Furthermore, the control unit 15 functions as the data generating device of the present invention by executing the routine of FIG. 7 through the data generating unit 26.

The present invention is not limited to the above embodiment and can be implemented in an appropriate embodiment. In the above embodiment, a paper member of a card type is used as the printing target medium. However, the printing target medium is not limited to the embodiment like this. For example, members such as a plastic member or a metallic member may be used as the printing target medium as long as the members can be printed by a printer.

In addition, in the above embodiment, the printing target medium is used as the recording medium. However, the recording medium is not limited to the embodiment like this. For example, a storage unit of a device including a display unit such as a mobile telephone or a personal computer (PC) may be used as the recording medium. In this case, the synthesis image GG (or the card image KG) can be displayed through the display unit. Furthermore, the recording medium is not limited to a medium capable of displaying the image. In other words, a storage medium such as a magnetic storage medium such as a hard disk, an optical storage medium such as a DVDROM or a CDROM, or a nonvolatile semiconductor memory such as an EEPROM may be used as the recording medium.

Furthermore, the data output device is not limited to the printer 16. For example, various kinds of communication devices that output image data using a network such as the Internet or a communication means such as infrared rays may be used as the data output device. In addition, in the above embodiment, predetermined information is converted into the 2D bar code, and printed on the character card KC. However, an embodiment in which predetermined information is recorded is not limited to this example. For example, predetermined information may be converted into a bar code and printed on a recording medium. Alternatively, data to express a code generated according to a predetermined standard such as a 2D bar code or a bar code may be stored in a recording medium as predetermined information. Furthermore, predetermined information is not limited to a coded embodiment. For example, predetermined information itself may be stored in a storage medium as data used to reproduce a predetermined image stored in a storage medium. Thus, for example, in the above embodiment, the image data itself may function as predetermined information.

In the above embodiment, player name set by the player is used as player information. However, the player information is not limited to the embodiment like this. For example, a unique player ID (a user ID) may be used for each player as player information. For example, the player ID may be given through a service for a game provided via a network such as the Internet. For example, a service for a game is provided by a server device connected to a setting device such as a mobile phone or a PC via a network. In addition, for example, the player ID may be input by the player each time a game is played.

Alternatively, the player ID may be acquired using a storage medium capable of recording various kinds of information including the player ID. Furthermore, a card that stores a predetermined cost and is used to make a payment of a predetermined cost may be used as the storage medium. The card may be assigned a unique card ID for each card. In this case, for example, a player ID may be identified based on ID management data in which a card ID is associated with a player ID. For example, the ID management data or data used to manage a player corresponding to a player ID may be provided from a server device via a network and then stored in a game machine when the game machine is connected to the network.

In the above embodiment, a difference related to whether or not production of a card is possible or a difference related to whether or not it is possible to designate as an operation target (or a raising target) during a game is employed as the difference in treatment between classifications. However, the difference in treatment between classifications is not limited to this example. For example, a card other than a card classified into the player card may be refused to be reproduced in a game. In other words, the difference in treatment between classifications may be made such that a card other than a card classified into the player card is not allowed to be used in a game. In addition, in the above embodiment, the game machine 1 executes the monster raising game. However, a game executed by the game machine 1 is not limited to the game like this. For example, various kinds of games such as an action game and a role-playing game may be executed. In addition, various kinds of game machines such as game machines for business use, game machines for home use, stationary game machines, and portable game machines, personal computers, mobile terminals, or the like may be used as the game machine.

What is claimed is:

1. A game machine acquiring predetermined information used to reproduce a predetermined image during a game from a recording medium, and using the predetermined image reproduced during the game based on the acquired predetermined information for a progress of the game, and wherein the game machine comprises:

an input device adapted and configured to collect a predetermined cost for playing the game, an information acquiring device adapted and configured to acquire from the recording medium, user information that is recorded in the recording medium as information used to identify each user playing the game and is associated with the predetermined image, an image reproducing device adapted and configured to reproduce a plurality of predetermined images during the game based on the predetermined information of each recording medium;

an image classifying device adapted and configured to classify each predetermined image reproduced during the game by the image reproducing device based on the user information associated with each predetermined image into classifications which are dealt with differently from each other in the game based on an acquisition result of the information acquiring device;

a data generating device adapted and configured to generate output data including reflected information used to reproduce a reflected image in which a game result is reflected such that the reflected image is used as the predetermined image and the reflected information is used as the predetermined information; and a printing device adapted and configured to output the output data to the recording medium such that the reflected information is recorded as the predetermined information, wherein the recording medium comprises a new card printed on a printing target medium and including at least one of the predetermined image and the predetermined information based on the game result.

2. The game machine according to claim 1, wherein the image classifying device classifies the predetermined images into classifications such that in first user information in which the predetermined information is first acquired on the play of a predetermined range based on the predetermined cost and user information acquired after the first user information, pieces of user information corresponding to the same user as the first user information are classified into the same classification, and among pieces of user information acquired after the first user information, pieces of user information corresponding to a user different from the first user information are classified into another classification different from the same classification.

3. The game machine according to claim 1, wherein the data generating device restricts a generation target of the output data in units of classifications, and the classifications are dealt with differently from each other depending on whether or not generation of the output data is restricted.

4. The game machine according to claim 1, wherein information of a user name set by each user is used as the user information.

5. The game machine according to claim 2, wherein information of a user name set by each user is used as the user information.

6. The game machine according to claim 1, wherein the predetermined information is recorded in the recording medium as a code generated so as to include the predetermined information according to a predetermined standard or as data used to express the code as an image.

7. The game machine according to claim 2, wherein the predetermined information is recorded in the recording medium as a code generated so as to include the predetermined information according to a predetermined standard or as data used to express the code as an image.

8. The game machine according to claim 6, wherein a 2D bar code is used as the code.

9. A control method of controlling a computer incorporated in a game machine acquiring predetermined information used to reproduce a predetermined image during a game from a recording medium, and using the predetermined image reproduced during the game based on the acquired predetermined information for a progress of the game, and wherein the control method of controlling the computer comprises the steps:

a cost collection step that collects, via an input device, a predetermined cost for playing the game;

an information acquiring step that acquires from the recording medium, user information that is recorded in the recording medium as information used to identify each user playing the game and is associated with the predetermined image;

an image reproducing step that reproduces a plurality of predetermined images during the game based on the predetermined information of each recording medium;

an image classifying step that classifies each predetermined image reproduced during the game by the image reproducing device based on the user information associated with each predetermined image into classifications which are dealt with differently from each other in the game based on an acquisition result of the information acquiring device;

a data generating step that generates, via a data generating device, output data including reflected information used to reproduce a reflected image in which a game result is reflected such that the reflected image is used as the predetermined image and the reflected information is used as the predetermined information; and a printing step that prints, via a printing device, the output data to the recording medium such that the reflected information is recorded as the predetermined information, wherein the recording medium comprises a new card printed on a printing target medium and including at least one of the predetermined image and the predetermined information based on the game result.

10. A non-transitory computer readable storage medium storing a computer program for a game machine acquiring predetermined information used to reproduce a predetermined image during a game from a recording medium, and using the predetermined image reproduced during the game based on the acquired predetermined information for a progress of the game, and wherein the computer program is configured so as to cause a computer which is incorporated in the game machine to serve as:

an input device for collecting a predetermined cost for playing the game;

an information acquiring device adapted and configured to acquire from the recording medium, user information that is recorded in the recording medium as information used to identify each user playing the game and is associated with the predetermined image;

an image reproducing device adapted and configured to reproduce a plurality of predetermined images during the game based on the predetermined information of each recording medium;

an image classifying device adapted and configured to classify each predetermined image reproduced during the game by the image reproducing device based on the user information associated with each predetermined image into classifications which are dealt with differently from each other in the game based on an acquisition result of the information acquiring device;

a data generating device adapted and configured to generate output data including reflected information used to reproduce a reflected image in which a game result is reflected such that the reflected image is used as the predetermined image and the reflected information is used as the predetermined information; and a printing device adapted and configured to output the output data to the recording medium such that the reflected information is recorded as the predetermined information, wherein the recording medium comprises a new card printed on a printing target medium and including at least one of the predetermined image and the predetermined information based on the game result.

* * * * *